United States Patent
Kim et al.

(10) Patent No.: US 9,784,577 B2
(45) Date of Patent: Oct. 10, 2017

(54) MEASURING DISTANCE FROM OBJECT BY USING SIZE OF PATTERN PROJECTED ONTO OBJECT

(71) Applicant: LG INNOTEK CO., LTD., Seoul (KR)

(72) Inventors: Jun Chul Kim, Seoul (KR); Sung Hyun Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 231 days.

(21) Appl. No.: 13/832,722

(22) Filed: Mar. 15, 2013

(65) Prior Publication Data
US 2013/0242089 A1   Sep. 19, 2013

(30) Foreign Application Priority Data
Mar. 16, 2012   (KR) .................. 10-2012-0027102

(51) Int. Cl.
G01C 11/02  (2006.01)
G01C 3/08   (2006.01)
G01B 11/02  (2006.01)

(52) U.S. Cl.
CPC .......... G01C 11/02 (2013.01); G01B 11/026 (2013.01); G01C 3/08 (2013.01)

(58) Field of Classification Search
CPC .................................................. G01C 11/02
See application file for complete search history.

(56) References Cited

U.S. PATENT DOCUMENTS

| | | | | |
|---|---|---|---|---|
| 4,943,824 A | * | 7/1990 | Nabeshima | G02B 7/32 356/3.01 |
| 5,225,876 A | * | 7/1993 | Lux | G01S 7/4817 356/2 |
| 5,247,327 A | * | 9/1993 | Suzuka | G02B 7/32 396/109 |
| 5,493,362 A | * | 2/1996 | Nonaka | G02B 7/32 356/3.04 |
| 5,596,386 A | * | 1/1997 | Hankawa | G02B 7/32 250/201.6 |
| 5,708,860 A | * | 1/1998 | Nonaka | G02B 7/32 396/25 |

(Continued)

FOREIGN PATENT DOCUMENTS

| JP | 2007-304124 A | 11/2007 |
|---|---|---|
| JP | 2012-022309 A | 2/2012 |

OTHER PUBLICATIONS

Office Action dated Apr. 16, 2013 in Korean Application No. 10-2012-0027102, filed Mar. 16, 2012.

*Primary Examiner* — Jay Patel
*Assistant Examiner* — Irfan Habib
(74) *Attorney, Agent, or Firm* — Saliwanchik, Lloyd & Eisenschenk

(57) ABSTRACT

An apparatus for measuring a distance can include a camera module and a film having a reference pattern. The camera module can include an infrared LED transmission unit to transmit an infrared LED light toward the film and a module unit calculating a distance from an object by using a size of a pattern projected onto the object which is obtained from an image of a camera unit. The film can include an infrared film and a plurality of holes formed in the infrared film.

9 Claims, 3 Drawing Sheets

(56) References Cited

U.S. PATENT DOCUMENTS

| | | | | |
|---|---|---|---|---|
| 5,838,428 A * | 11/1998 | Pipitone | | G01S 17/89 356/3.09 |
| 5,963,309 A * | 10/1999 | Nakanishi | | G01S 17/87 356/3.01 |
| 6,023,292 A * | 2/2000 | Wakui | | H04N 5/232 348/211.2 |
| 6,483,536 B2 * | 11/2002 | Aoyama | | G01C 3/02 250/559.31 |
| 6,501,537 B1 * | 12/2002 | Chahl | | G01C 3/08 356/3.14 |
| 6,697,557 B2 * | 2/2004 | Mukherjee | | G02B 6/2931 385/116 |
| 7,164,117 B2 * | 1/2007 | Breed | | B60R 21/01516 250/208.1 |
| 7,327,440 B2 * | 2/2008 | Horn | | G01C 3/08 356/3.06 |
| 7,619,680 B1 * | 11/2009 | Bingle | | B60R 11/04 348/342 |
| 2001/0043335 A1 * | 11/2001 | Norita | | G06T 7/521 356/601 |
| 2002/0009298 A1 * | 1/2002 | Akutsu | | G03B 17/24 396/319 |
| 2002/0028001 A1 * | 3/2002 | Doi | | G06T 7/70 382/103 |
| 2002/0040971 A1 * | 4/2002 | Ono | | G01S 17/08 250/559.38 |
| 2003/0205670 A1 * | 11/2003 | Shibayama | | G01J 5/12 250/338.4 |
| 2004/0037546 A1 * | 2/2004 | Nonaka | | G03B 13/34 396/121 |
| 2005/0118391 A1 * | 6/2005 | Kavvadias | | B32B 3/14 428/131 |
| 2005/0220450 A1 * | 10/2005 | Enomoto | | G01S 17/08 396/104 |
| 2005/0231465 A1 * | 10/2005 | DePue | | G01D 5/30 345/156 |
| 2007/0065042 A1 * | 3/2007 | Vroomen | | G06T 7/60 382/286 |
| 2007/0182528 A1 * | 8/2007 | Breed | | B60Q 9/008 340/435 |
| 2008/0046150 A1 * | 2/2008 | Breed | | B60R 21/0134 701/45 |
| 2009/0185157 A1 * | 7/2009 | Imamura | | G01C 3/085 356/3.01 |
| 2009/0225329 A1 * | 9/2009 | Bendall | | G02B 23/2407 356/610 |
| 2009/0237644 A1 * | 9/2009 | Uechi | | B60W 30/10 356/29 |
| 2010/0067890 A1 * | 3/2010 | Ogino | | G02B 7/282 396/104 |
| 2011/0202310 A1 * | 8/2011 | Min | | G01S 17/10 702/166 |
| 2011/0320013 A1 * | 12/2011 | Chen | | F24F 11/0034 700/12 |
| 2012/0105823 A1 * | 5/2012 | Hardegger | | G01S 17/023 356/5.01 |
| 2012/0147188 A1 * | 6/2012 | Yokochi | | B60R 1/00 348/148 |
| 2012/0176298 A1 * | 7/2012 | Suh | | H01L 27/3234 345/82 |
| 2012/0262365 A1 * | 10/2012 | Mallinson | | G01S 1/725 345/156 |
| 2013/0123015 A1 * | 5/2013 | Jung | | G06K 9/78 463/37 |
| 2013/0169643 A1 * | 7/2013 | Suh | | G01B 11/22 345/426 |
| 2014/0210964 A1 * | 7/2014 | Muijs | | G06T 7/571 348/54 |
| 2015/0193933 A1 * | 7/2015 | Lim | | G01S 17/46 348/136 |

\* cited by examiner

MEASURING DISTANCE FROM OBJECT BY USING SIZE OF PATTERN PROJECTED ONTO OBJECT

CROSS-REFERENCE TO RELATED APPLICATION

This application claims the benefit under 35 U.S.C. §119 of Korean Patent Application No. 10-2012-0027102, filed Mar. 16, 2012, which is hereby incorporated by reference in its entirety.

BACKGROUND

The disclosure relates to an apparatus for measuring a distance to a subject by using an infrared LED, and a method thereof. In more particular, the disclosure relates to a technology of measuring a distance to a subject by allowing infrared light, which is emitted through an infrared light transmission unit, to pass through a film having a pattern so that the pattern is projected onto the subject, and by allowing an infrared light reception unit to receive the infrared light reflected from the subject and incident to a lens to analyze the size of the pattern.

In general, a distance refers to a length of a straight line linking two points with each other. The schemes of measuring the distance include generally-known various schemes such as a scheme of calculating the distance by dividing the distance between two points, measuring the length of each section by using a ruler or a reference meter having a predetermined length, and obtaining the sum of lengths, a triangulation scheme of directly and mechanically measuring included angles provided at both ends of a scale, which has a predetermined length and placed between two measurement points, by using a theodolite telescope, a scheme of measuring the distance by reading scale intervals between two scribed lines on an image viewed through a telescope, and a scheme of calculating the distance based the speed or the time of light or an electromagnetic wave.

According to the scheme of measuring the distance between two points using the reference meter such as the ruler, a measurer must personally measure the length of each section to calculate the distance, so that measurement efficiency and precision may be significantly degraded. According to the measuring scheme based on a telescope, the high cost is required. In addition, since the measurer must read the intervals of the scale interposed between two scribed lines to calculate the distance, errors may frequently occur when measuring the distance.

The above problems have been seriously pointed out in various measurement fields requiring the measurement precision and the measurement speed, and the substitute for the schemes are urgently required. Accordingly, the disclosure suggests a structure for measuring a real distance using infrared light and a method thereof as a subject matter.

BRIEF SUMMARY

The disclosure provides an apparatus for measuring a distance, capable of irradiating an infrared LED light onto a subject, which is located at a predetermined point, by using an infrared LED in such a manner that the infrared LED light passes through a film having a pattern, and analyzing the size of a pattern projected onto the subject by the infrared LED light in an infrared LED reception unit when measuring the distance, and a method thereof.

The disclosure provides an apparatus for measuring a distance, which can be realized in small size by employing the minimum of components and can have improved productivity, and a method thereof.

According to the embodiment, there is provided an apparatus for measuring a distance. The apparatus includes a camera module and a film having a reference pattern. The camera module includes an infrared LED transmission unit to transmit an infrared LED light toward the film.

As described above, according to the apparatus for measuring the distance of the embodiment can calculate the distance between the object and the sensor by calculating the size of the projected pattern varying depending on the distance between the object and the sensor.

In addition, since infrared light transmitting and receiving units are provided in a single camera module, a device can be realized in small size.

DETAILED DESCRIPTION

Figure 1:
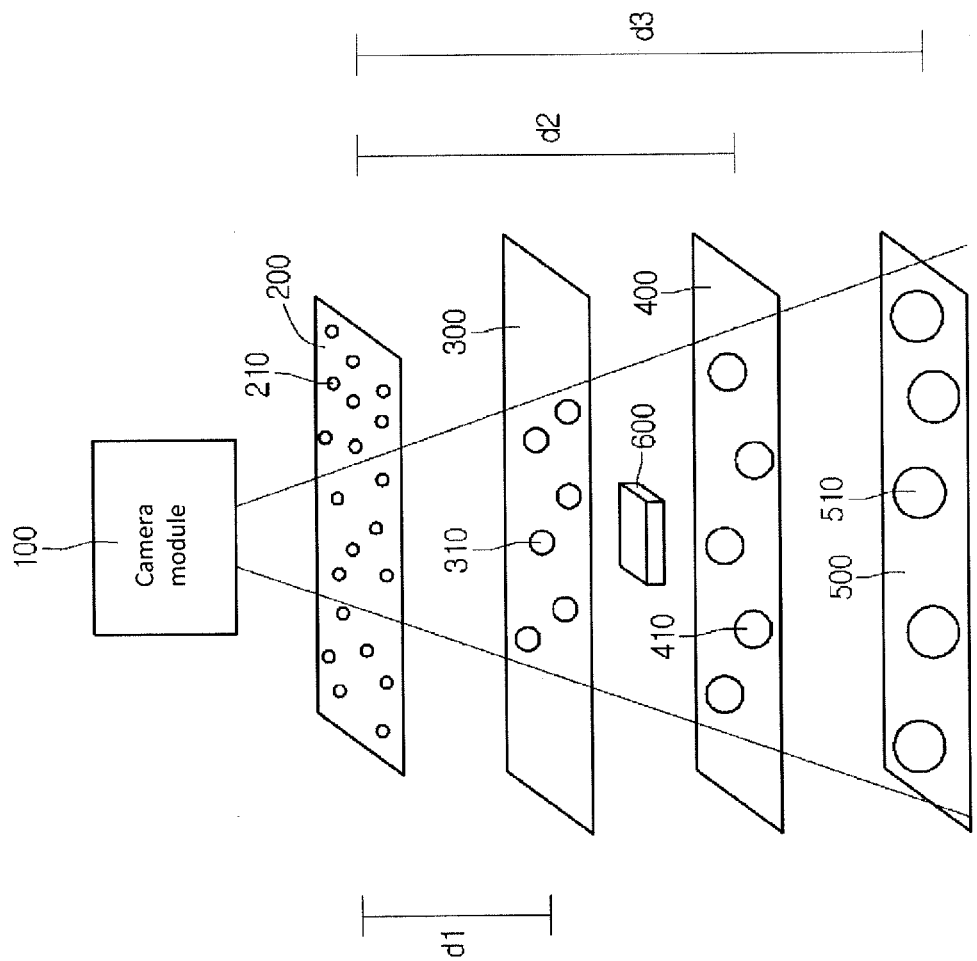
FIG. 1 is a schematic view showing the operation of an apparatus for measuring a distance according to the embodiment.

Hereinafter, exemplary embodiments of the disclosure will be described in detail with reference to accompanying drawings. The details of other embodiments are contained in the detailed description and accompanying drawings. The advantages, the features, and schemes of achieving the advantages and features of the disclosure will be apparently comprehended by those skilled in the art based on the embodiments, which are detailed later in detail, together with accompanying drawings. The same reference numerals will be assigned to the same elements throughout the whole description.

Figure 2:
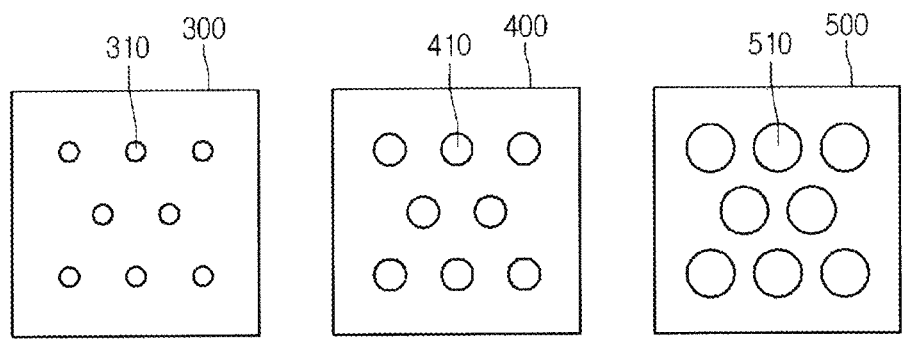
FIG. 2 shows patterns projected onto an object in the apparatus for measuring the distance according to the embodiment.
Figure 3:
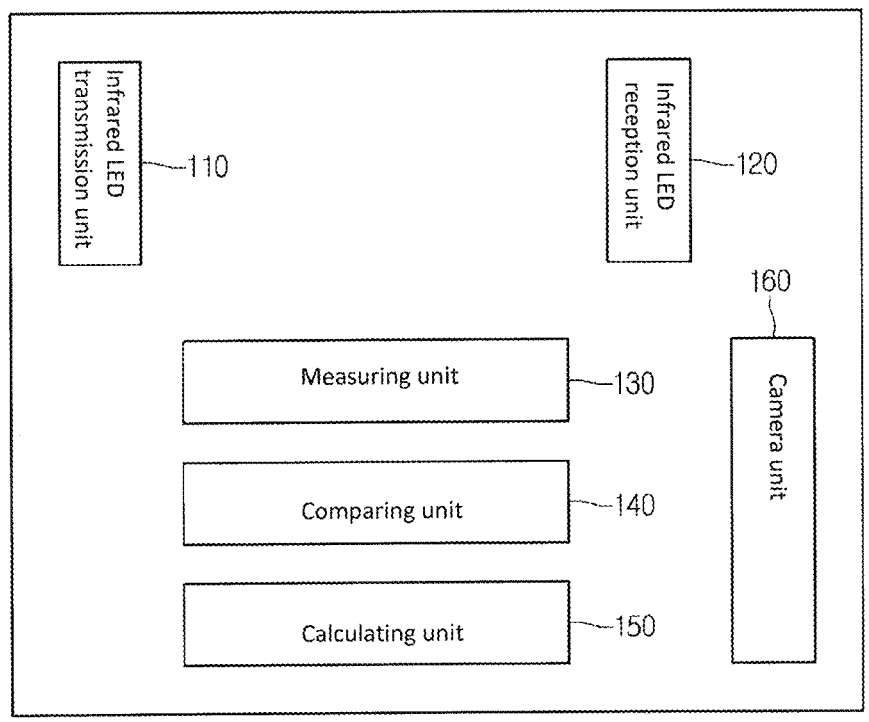
FIG. 3 is a block diagram showing the apparatus for measuring the distance according to the embodiment.

FIG. 1 is a schematic view showing the operation of an apparatus for measuring a distance according to the embodiment. FIG. 2 shows patterns projected onto an object in the apparatus for measuring the distance according to the embodiment. FIG. 3 is a block diagram showing the apparatus for measuring the distance according to the embodiment.

The apparatus for measuring the distance according to the embodiment includes a camera module 100 and a film 200 formed therein with a reference pattern 210.

The camera module 100 includes an infrared LED transmission unit 110, an infrared LED reception unit 120, a measuring unit 130, a comparing unit 140, and a calculating unit 150.

The infrared LED transmission unit 110 of the camera module 100 may include an LED to emit infrared light.

The infrared LED transmission unit 110 emits the infrared light toward an object 600.

The measuring unit 130 measures the size of a projected pattern to transmit the size of the projected pattern to the comparing unit 140.

The comparing unit 140 compares the size of the pattern, which is received therein from the measuring unit 130, with an intrinsic parameter, such as a critical value, and calculates comparison data.

The comparing unit 140 may further include a storage unit (not shown) storing the intrinsic parameter.

The calculating unit 150 calculates the distance between the camera module 100 and the object 600 based on the comparison information of the comparing unit 140.

In addition, the infrared LED reception unit 120 may include an infrared filter.

The infrared LED reception unit 120 may collect information of the infrared light projected onto the surface of the object 600 through the infrared filter.

In addition, the camera module 100 is provided therein with a camera unit 160 to collect image information of the object 600.

As described above, the camera module 100 includes the camera unit 160 to photograph the pattern projected onto the object 600, so that the operations of the measuring unit 130, the comparing unit 140, and the calculating unit 150 are performed according to the image information obtained from the camera unit 160.

As described above, since the camera unit 160 and the distance measuring units are provided in the same camera module 100, the small-size device can be realized, and the productivity can be improved.

Meanwhile, as shown in FIG. 1, the reference pattern 210 may be formed on the infrared film 200. The reference pattern 210 may have various shapes of a circle, a triangle, a rectangle, and a diamond, but the embodiment is not limited thereto.

The infrared film 200 cuts off infrared light, and the reference pattern 210 may be formed in the shape of a hole.

In other words, the light emitted through the reference pattern 210 may be projected on the surface of the object in the shape the same as that of the reference pattern 210.

The infrared film 200 may be formed closely to the infrared LED transmission unit 110. The infrared film 200 may be attached to an outlet of the infrared LED transmission unit 110 through which the light of the infrared LED transmission unit 110 is emitted.

In this case, the location of the infrared LED transmission unit 110 may be significantly close to that of the camera unit 160.

As shown in FIG. 1, light is emitted from an infrared LED of the infrared LED transmission unit 110 provided in the camera module 100. The light from the infrared LED may be directed toward the object 600 through the film 200 having the reference pattern 210. The light emitted from the infrared LED is directed through the reference pattern 210 due to the straightness thereof. At this time, a portion of the light is cut off in the shape the same as that of the reference pattern 210, and another portion of the light passes through the reference pattern 210. If the infrared light passing through the reference pattern 210 makes contact with the surface of the object 600, a pattern is projected at the contact region with the object 600.

In this case, as the distance between the object 600 and the camera module 100 is increased, the size of the projected pattern is increased. As the distance between the object 600 and the camera module 100 is decreased, the size of the projected pattern is decreased.

In detail, first patterns 310, which are projected onto a point spaced apart from the film 200 by a distance d1, may have the same area at the same distance d1.

In addition, second patterns 410, which are projected onto a point spaced apart from a film 300 by a distance d2, may have the same area at the same distance d2. This characteristic is identically applied to third patterns 510.

Since the travelling distance of the light is more increased toward the third patterns 510 from the first patterns 310, the size of the patterns is more increased due to the straightness of the light. In addition, the first to third patterns 310 to 510 have the same shape because the infrared light straightly passes through the reference pattern 210. In other words, as the distance between the object 600 and the camera module 100 is increased, the area of the projected pattern of the reference pattern 210 may be increased, but the shape of the projected pattern is not changed.

Although the distance is divided into distances d1, d2, and d3 in accompanying drawings, the distance between the object 600 and the camera module 100 may have a predetermined value. When the object 600 is provided between the distances d1 and d2, the size of the pattern formed on the surface of the object 600 may have a value between the sizes of the first and second patterns 310 and 410. In addition, when the object 600 is provided between the distances d2 and d3, the size of the pattern formed on the surface of the object 600 may have a value between the sizes of the second and third patterns 410 and 510.

In addition, if the object 600 moves so that the distance between the object 600 and the camera module 100 is changed, the size of a pattern projected onto the surface of the object 600 is also changed. In detail, if the distance between the object 600 and the camera module 100 is reduced, the size of the pattern projected onto the surface of the object 600 is reduced. If the distance between the object 600 and the camera module 100 is increased, the size of the pattern projected onto the surface of the object 600 is increased.

The object 600 may be a portion of a human body for the measurement of the distance from the camera module 100. For example, the object 600 may be a hand.

In addition, if the camera module 100 is mounted on a vehicle and used for a rear camera, the object 600 may be a vehicle located in the rear of the camera module 100.

If the camera module 100 is applied to the rear camera, and if the distance from the object 600, that is, the rear vehicle is reduced to a predetermined interval or less, an alarm sound may ring or a lamp may be turned off through the settings. In this case, as the distance from the rear vehicle is shorter, the ringing period of the alarm sound or the turning-off period of the lamp is reduced, so that a user can recognize the distance from the rear vehicle.

Although not shown, the camera module 100 may further include a display unit to display distance data calculated through the above process.

Figure 4:
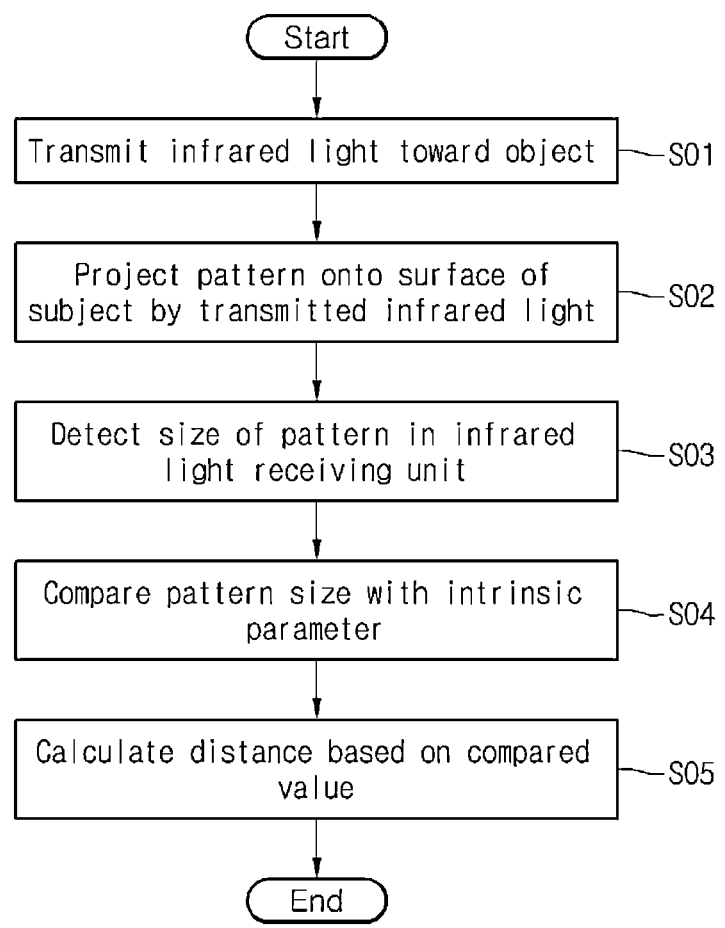
FIG. 4 is a flowchart showing a method of measuring a distance by using an infrared sensor according to the embodiment.

FIG. 4 is a flowchart showing a method of measuring a distance by using an infrared sensor according to the embodiment.

First, infrared LED light is transmitted toward an object (step S01). The infrared LED light is transmitted from the infrared LED transmission unit 110. The infrared LED light passes through the film 200 having the pattern. Next, the pattern is projected onto the surface of the object by the transmitted infrared LED light. Thereafter, the size of the projected pattern formed by the infrared LED light is detected by the infrared LED reception unit 120 (step S03). The detected size of the pattern is compared with an intrinsic parameter in the comparing unit 140 (step S04). The distance between the object and the camera module is calculated based on the detected size in the above step (step S05).

As shown in FIG. 3, if the camera unit 160 is provided in the camera module 100, the camera module 100 may extract the information of the pattern formed on the surface of the object 600 from the image information collected by the camera unit 160 and collect the information of the pattern.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for measuring a distance, the apparatus comprising:
    a camera unit that photographs an object;
    a light transmission unit that irradiates an infrared light onto the object;
    a film provided at an outlet of the light transmission unit and having a pattern having a first size allowing only a portion of light to be projected onto the object; and
    a module unit that calculates a distance from the object by using a second size of a pattern projected onto the object which is obtained from an image of the camera unit;
    wherein the film comprises:
        an infrared film that cuts off the light; and
        a plurality of holes formed in the infrared film and corresponding to the pattern,
    wherein the plurality of holes comprises a first hole and a second hole spaced apart from the first hole,
    wherein the camera unit and the module unit are provided in a same camera module,
    wherein the pattern having the first size and the pattern having the second size have the same shape,
    wherein the module unit calculates the distance from the object by comparing the first size of the pattern of the film with the second size of the pattern projected onto the object, and
    wherein the module unit comprises:
    an infrared light reception unit that receives the infrared light;
    a measuring unit that measures the second size of the pattern projected onto a surface of the object;
    a comparing unit that compares the second size of the pattern with an intrinsic parameter; and
    a calculating unit that calculates the distance based on a value detected by the comparing unit.

2. The apparatus of claim 1, wherein each of the first and second holes has a circular shape, a triangular shape, a rectangular shape, or a diamond shape.

3. The apparatus of claim 2, wherein the light transmission unit includes at least one infrared LED.

4. The apparatus of claim 1, wherein the infrared light reception unit includes an infrared filter.

5. The apparatus of claim 1, further comprising a display unit displaying the calculated distance data.

6. The apparatus of claim 1, wherein the second size of the pattern projected onto a surface of the object is determined depending on a distance between the apparatus and the object.

7. The apparatus of claim 6, wherein the second size of the pattern projected onto the surface of the object is proportional to the distance between the apparatus and the object.

8. The apparatus of claim 1, wherein the apparatus for measuring the distance is mounted at a rear portion of a vehicle to measure the distance from the object located at a rear of the vehicle.

9. An apparatus for measuring a distance, the apparatus comprising:
    a camera unit that photographs an object;
    a light transmission unit that irradiates a light onto the object;
    a film provided at an outlet of the light transmission unit and having a pattern having a first size that allows only a portion of light to be projected onto the object; and
    a module unit that calculates a distance from the object by using a second size of a pattern projected onto the object which is obtained from an image of the camera unit;
    wherein the film comprises:
        an infrared film that cuts off the light; and
        a plurality of holes formed in the infrared film and corresponding to the pattern,
    wherein the plurality of holes comprises a first hole and a second hole spaced apart from the first hole,
    wherein the camera unit and the module unit are provided in a same camera module,
    wherein the pattern having the first size and the pattern having the second size have the same shape,
    wherein the module unit calculates the distance from the object by comparing the first size of the pattern of the film with the second size of the pattern projected onto the object, and
    wherein the camera module extracts information of the pattern formed on a surface of the object from image information collected by the camera unit and collects the information of the pattern formed on the surface of the object.

* * * * *